United States Patent
Perdue et al.

(10) Patent No.: US 10,118,766 B2
(45) Date of Patent: Nov. 6, 2018

(54) SPLICE LINK FOR CONVEYOR BELT

(71) Applicant: CAMBRIDGE INTERNATIONAL, INC., Cambridge, MD (US)

(72) Inventors: Thomas O. Perdue, Salisbury, MD (US); Robert E. Maine, Jr., Salisbury, MD (US); George H. Messick, Jr., Cambridge, MD (US); Jeffrey D. Ulchak, Salisbury, MD (US); Melody Elizabeth Fernaays, Yorktown, VA (US)

(73) Assignee: CAMBRIDGE INTERNATIONAL, INC., Cambridge, MD (US)

( * ) Notice: Subject to any disclaimer, the term of this patent is extended or adjusted under 35 U.S.C. 154(b) by 0 days.

(21) Appl. No.: 15/455,912

(22) Filed: Mar. 10, 2017

(65) Prior Publication Data
US 2017/0260004 A1   Sep. 14, 2017

Related U.S. Application Data

(60) Provisional application No. 62/306,374, filed on Mar. 10, 2016.

(51) Int. Cl.
*B65G 17/38* (2006.01)
*B65G 17/06* (2006.01)

(52) U.S. Cl.
CPC .......... *B65G 17/38* (2013.01); *B65G 17/063* (2013.01)

(58) Field of Classification Search
CPC .............................. B65G 17/38; B65G 17/063
USPC .................................................. 198/778, 848
See application file for complete search history.

(56) References Cited

U.S. PATENT DOCUMENTS

| | | | | |
|---|---|---|---|---|
| 2,619,306 | A | 11/1952 | Van Lake | |
| 4,222,483 | A * | 9/1980 | Wootton | B65G 17/068 198/831 |
| 5,141,102 | A * | 8/1992 | Roinestad | B65G 17/064 198/778 |
| 5,934,448 | A * | 8/1999 | Kucharski | B65G 17/064 198/778 |
| 6,354,432 | B1 | 3/2002 | Maine, Jr. et al. | |
| 7,600,632 | B2 * | 10/2009 | Hall | B65G 17/08 198/848 |
| 7,721,877 | B2 | 5/2010 | Maine, Jr. et al. | |
| 7,762,388 | B2 * | 7/2010 | Lago | B65G 17/063 198/778 |
| 7,802,675 | B2 * | 9/2010 | Hall | B65G 17/08 198/848 |
| 8,312,989 | B2 * | 11/2012 | McCormick | B65G 17/42 198/849 |

(Continued)

*Primary Examiner* — Douglas A Hess
(74) *Attorney, Agent, or Firm* — Buchanan Ingersoll & Rooney PC

(57) ABSTRACT

A splice link for a conveyor belt includes an outer locking bar including at least one lower tab and an offset portion, an inner connector bar including at least one opening configured to receive the at least one lower tab on the outer locking bar and a front face having an upper tab, the offset portion on the outer locking bar configured to engage the upper tab of the inner connector bar. A further aspect of the disclosure includes a conveyor belt including a plurality of spaced tractive rods, a plurality of parallel pairs of edge bar links interconnecting the plurality of spaced tractive rods, and a splice link disposed between adjacent pairs of edge bar links.

17 Claims, 13 Drawing Sheets

(56) References Cited

U.S. PATENT DOCUMENTS

| | | | |
|---|---|---|---|
| 8,356,709 B2 * | 1/2013 | Hall | B65G 17/08 |
| | | | 198/848 |
| 9,061,829 B2 * | 6/2015 | Salsone | B65G 15/30 |
| 9,150,359 B2 * | 10/2015 | Lasecki | B65G 17/063 |
| 9,371,190 B2 * | 6/2016 | Rettore | B65G 17/064 |
| 9,663,297 B1 * | 5/2017 | Steinhoff | B65G 17/063 |

* cited by examiner

SPLICE LINK FOR CONVEYOR BELT

TECHNICAL FIELD

The disclosure herein is directed to a splice link for a conveyor belt, and more particularly to a splice link for a metal conveyor belt having edge bar links.

BACKGROUND

Numerous variations of metal and plastic conveyor belts are used in today's conveyor belt applications. Each type of belt and belt material has its own benefits for the various conveyor belt applications. Plastic conveyor belts are known for being easy to install and repair. Designs for the edges of the plastic conveyor belts are such that the belts can be easily disassembled and reassembled without having to replace the components or use any special tools.

Historically, metal belts have often been preferred for applications that require high temperature, a need for a large amount of open area, and/or a need to sanitize the belt. However, one of the main disadvantages of metal belts has been the requirement to weld the edges of the belt during installation and repair. Furthermore, when a metal belt requires repair, some components of the belt cannot be reused, but must be replaced to return the belt to service. This means stocking additional belt components for the inevitable repairs, or waiting to receive those components from the belt supplier. Making repairs to metal belts often necessitates grinding and welding operations. Grinding results in metal dust and debris which can create sanitation issues, and welding usually requires a "hot work" permit along with special provisions to avoid a fire within the facility. Both operations typically create issues for the plant maintenance manager that should be avoided if possible.

One of the most commonly used types of conveyor belts for carrying diverse products along both straight and horizontally curved paths is a grid conveyor belt. Examples of conventional grid conveyor belts are the Cam-Grid® and the heavy duty Cam-Grid® conveyor belts available from Cambridge International, Inc., the assignee of the present invention. A grid conveyor belt, as shown generally in U.S. Pat. No. 6,354,432, the entire contents of which are hereby incorporated by reference, includes a plurality of spaced transverse rods slidably interconnected by at least two rows of U-shaped connecting links, i.e., the tension bearing members, disposed respectively along the inner and outer edges of the rods. The terminal ends of the transverse rods are formed into enlarged heads or button heads which retain the links on the rods and welds are then provided to secure the link to the button head and to the rod, thereby preventing rotational movement of the links on the transverse rods. The connecting links are disposed in a nested relationship relative to one another with slots being provided in the links in order to slidably receive the transverse rods.

Grid conveyor belts of this type have met with overwhelming market approval because of their ability to travel in straight line conveyor paths as well as in curved conveyor paths, thus making grid conveyor belts ideal for use on spiral cage conveyors. However, when the belt is in need of repair due to breakage or maintenance, the presence of the button head ends and welded ends requires the use of special tools such as a grinder and bolt cutter and welding in order to part an endless belt or to reconnect or splice two separate ends of a belt. In addition, special threaded connector rods with end nuts have to be used to replace the rods with the button head ends when performing repair/maintenance in the field.

Flat wire conveyor belts have also been in the market for many years, as shown for example in U.S. Pat. Nos. 2,619,306 and 7,721,877, the contents of which are hereby incorporated by reference. Flat wire conveyor belts are generally low maintenance and when positively driven with sprockets have little to no lateral shifting. With reference to FIG. 1A, there is disclosed a flat wire conveyor belt 10 comprising a plurality of connecting rods 12. In the illustrated embodiment, the conveyor belt 10 also includes a plurality of pickets 16, sometimes also referred to as wickets, which hinge about the connecting rods 12. The pickets of the belt define the tension bearing members and support the product to be conveyed and the rods are utilized to hold the components of belt together. This example of a flat wire conveyor belt also includes a plurality of edge bar links 14 and upset rod ends 18, i.e., button head shaped ends, for rod retention. The compression between the pickets keep them from moving inward of the button head ends, while the button head ends prevent the pickets from moving outwardly. Flat wire conveyor belts of this type can also be used in both straight and turn applications.

Flat wire conveyor belts have similarly met with long term market approval. However, when the belt is in need of repair due to breakage or maintenance, the presence of the button head or clinched rod ends requires the use of special tools such as a grinder or bolt cutters and welding or special hand tools in order to part an endless belt or to reconnect or splice two separate ends of a belt. In addition, special threaded or partially clinched connector rods with end nuts have to be used to replace the rods when performing repair/maintenance in the field.

With reference to FIG. 1B, the eye link conveyor belt 20 is constructed of small eyelets 22, which may be welded onto a cross wire 23 to form segments generally 4-12 inches in width, which are then cut-down as needed and brick-laid assembled with other components such as reinforcing/support bars 18 (bar links) to form a row of segments and components which are then linked to adjacent rows with hinge point connecting rods 16 (cross rods).

The major disadvantages of eye link style belts have been that the belt is constructed of components such as the reinforcing/support bars 18 that not only make the belt very expensive and time consuming to assemble but also make it more difficult to splice and maintain the conveyor belt in the field.

While market trends are dictating that improvements be made to reduce conveyor system down time, employers are finding that maintenance resources are decreasing in both quantity and skill base. Accordingly, there exists a need in the marketplace for a metal conveyor belt having a splice link that can quickly and easily be used to splice together and repair a conveyor belt with a minimal use of tools or skill, all while retaining the important features typically found in the metal belt.

SUMMARY

The disclosure herein provides a splice link for a conveyor belt comprising an outer locking bar including at least one lower tab and an offset portion; an inner connector bar including at least one opening configured to receive the at least one lower tab on the outer locking bar and a front face having an upper tab, the offset portion on the outer locking bar configured to engage the upper tab of the inner connector bar.

A further aspect of the disclosure is directed to a conveyor belt comprising a plurality of spaced tractive rods transversely disposed with respect to a direction of travel of the conveyor belt, each said rod having opposing first and second ends and a groove in each said end; a plurality of parallel pairs of edge bar links interconnecting said plurality of spaced tractive rods; and a splice link disposed between adjacent pairs of edge bar links.

BRIEF DESCRIPTION OF THE DRAWING FIGURES

These and other features and advantages of the disclosure will become more readily apparent to those skilled in the art upon reading the following detailed description, in conjunction with the appended drawings in which.

DETAILED DESCRIPTION

Figure 1A:
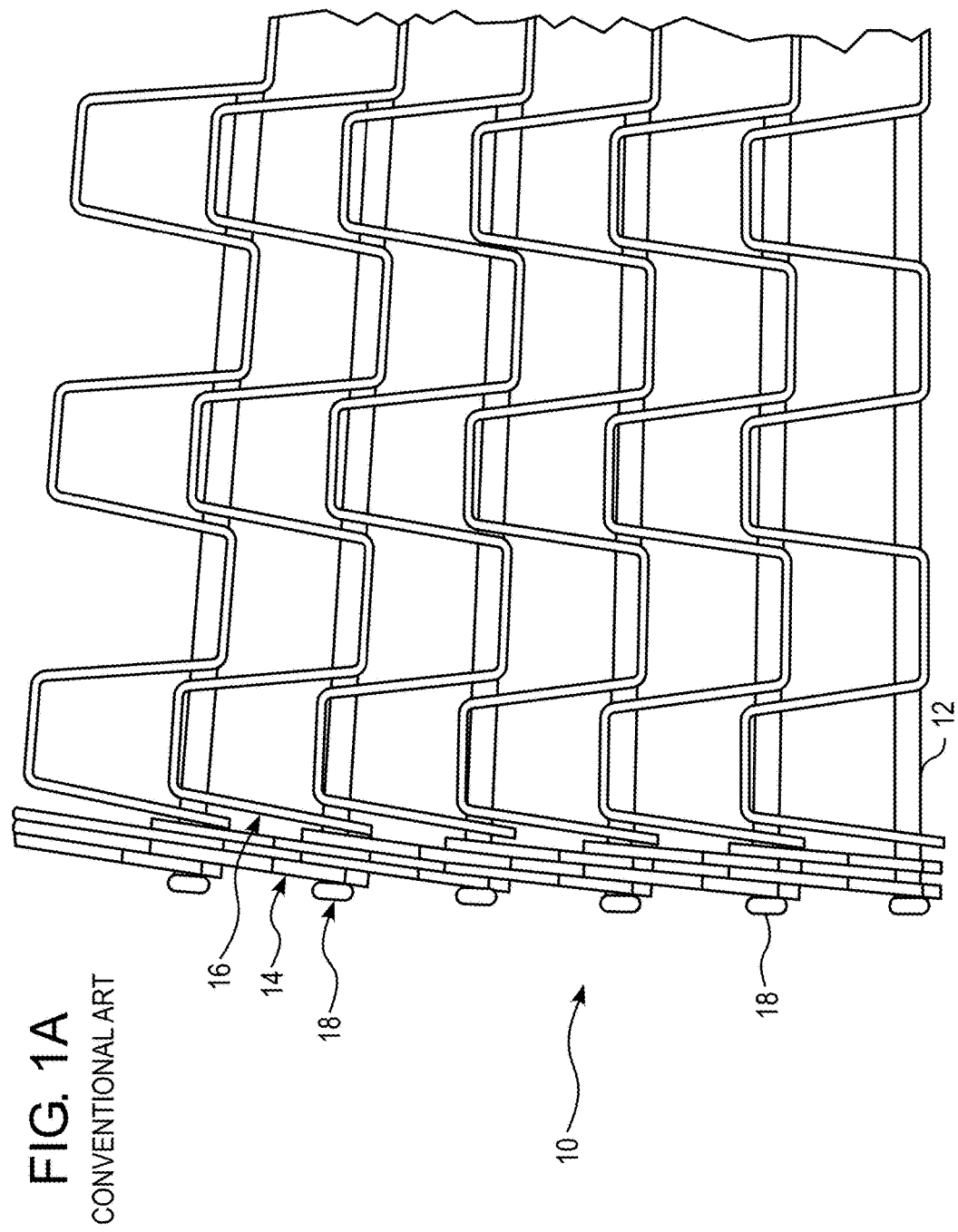
FIG. 1A is a plan view of a flat wire conveyor belt having edge bar links according to the conventional art.
Figure 1B:
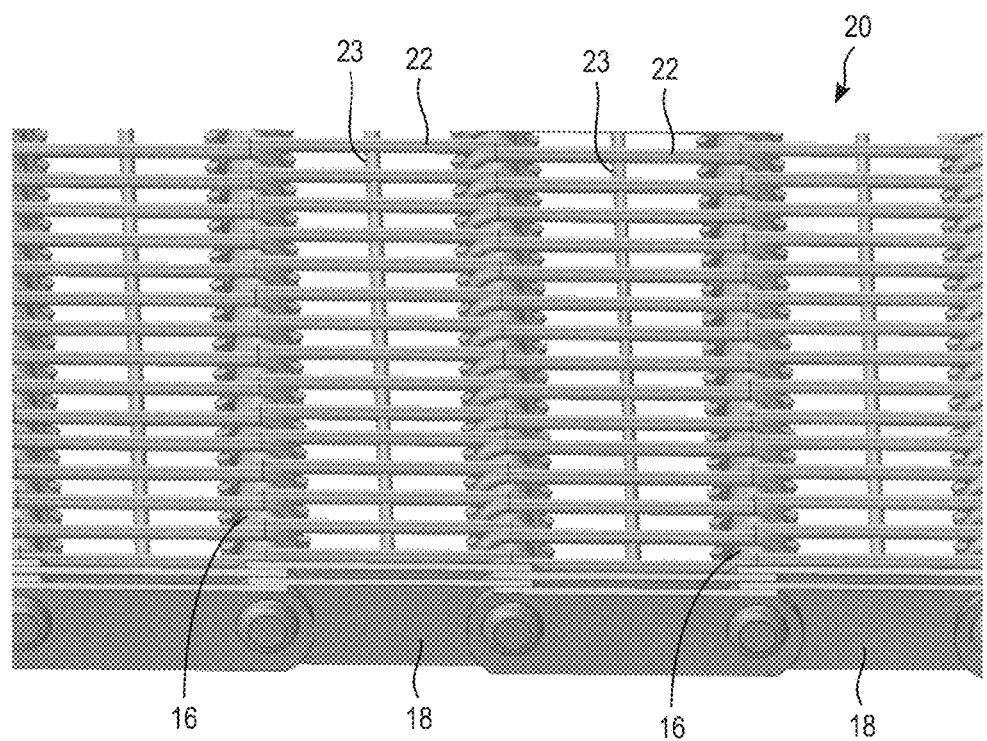
FIG. 1B is a plan view of an eye link conveyor belt having edge bar links according to the conventional art.
Figure 2:
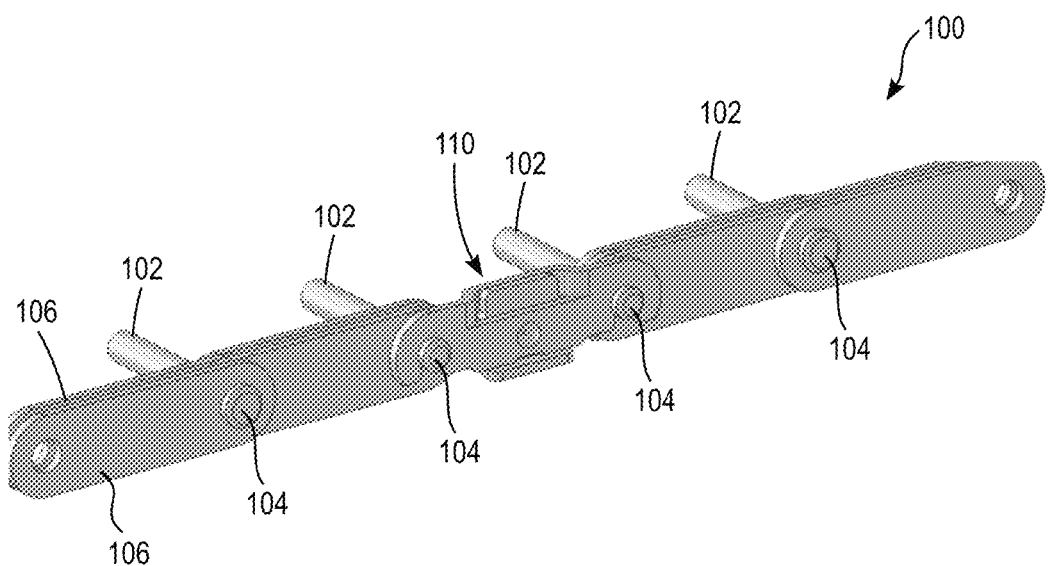
FIG. 2 is a perspective view of a portion of a conveyor belt including a splice link according to a first exemplary embodiment of the disclosure.
Figure 3:
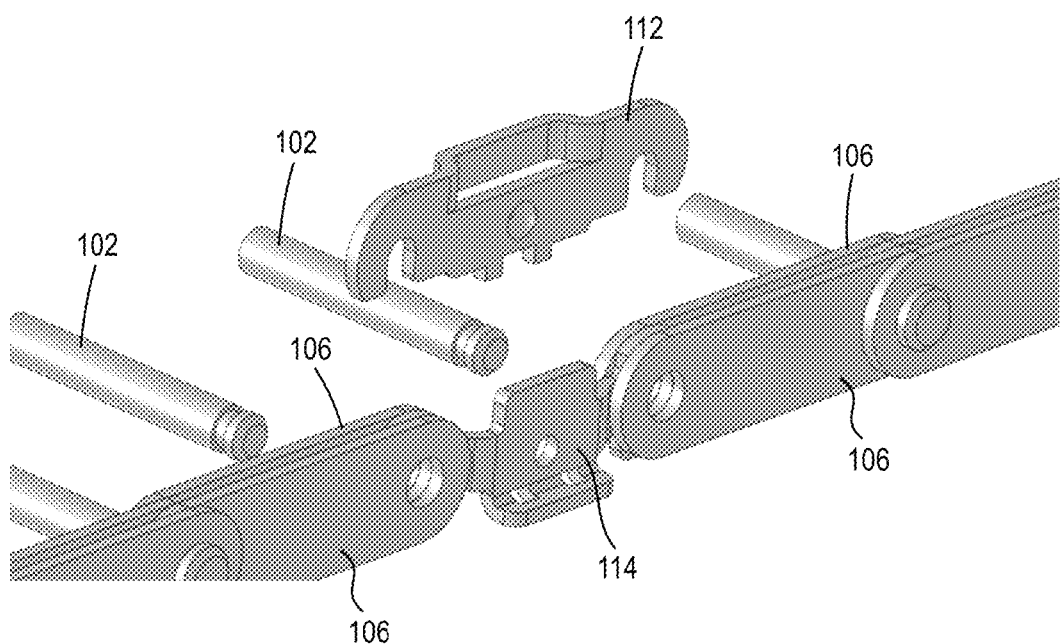
FIG. 3 is an exploded perspective view of the splice link according to the first exemplary embodiment of the disclosure.
Figure 4:
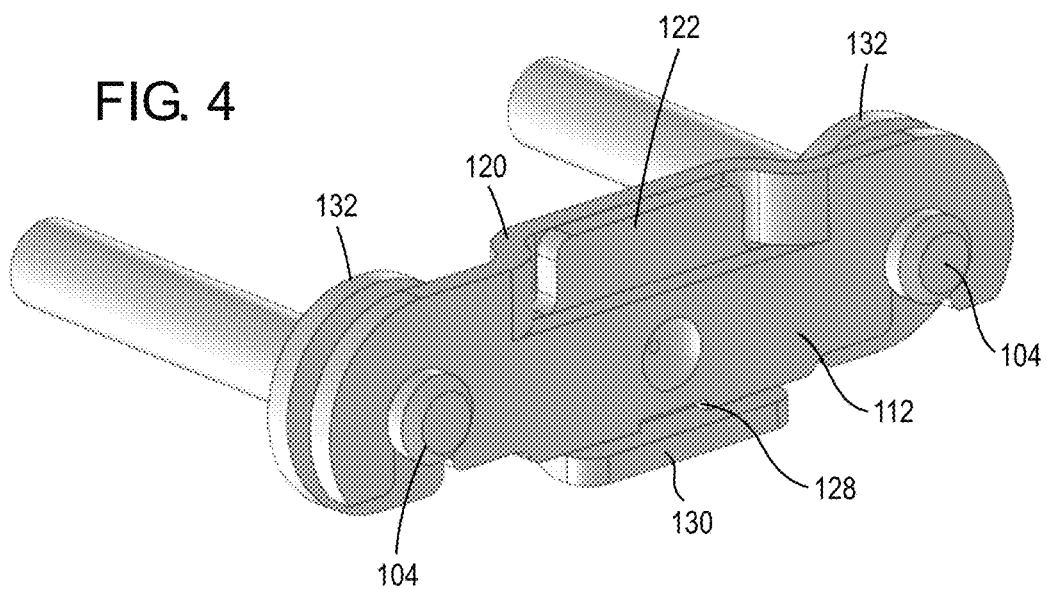
FIG. 4 is a perspective view of the splice link according to the first exemplary embodiment of the disclosure.
Figure 5:
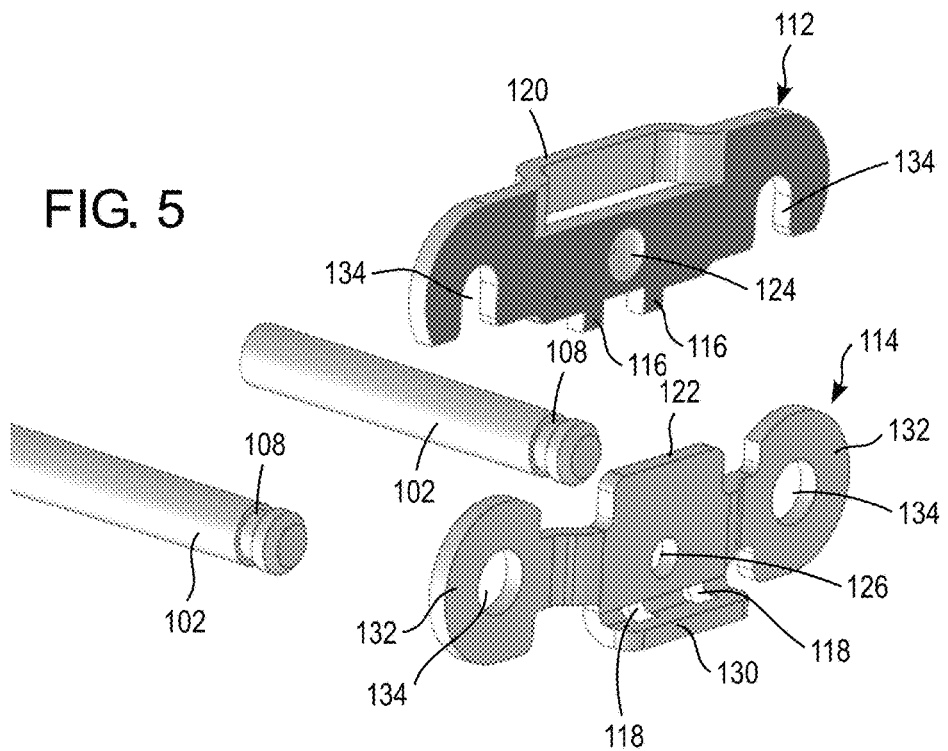
FIG. 5 is a further outer exploded perspective view of the splice link according to the first exemplary embodiment of the disclosure.
Figure 6:
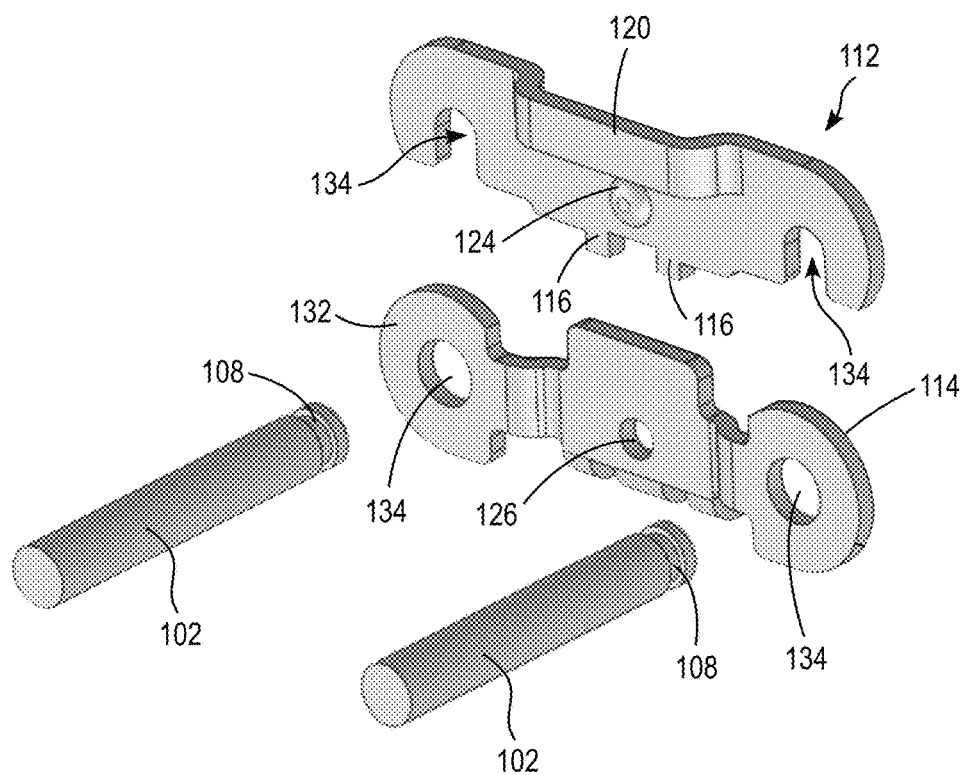
FIG. 6 is an inner outer exploded perspective view of the splice link according to the first exemplary embodiment of the disclosure.

A portion of a conveyor belt in accordance with the disclosure herein is shown generally in FIG. 2 by reference numeral 100. Conveyor belt 100 preferably comprises a metal conveyor belt including a plurality of spaced rods 102 disposed in succession and transversely with respect to a direction of travel, each rod 102 having two ends 104 (only one of which is shown). Conveyor belt 100 also includes pairs of parallel edge bar links 106 forming a double-row bar assembly. As will be appreciated by one skilled in the art, additional bar links could also be provided.

The disclosure herein provides a splice link 110 or master link suitable for use within a metal conveyor belt, such as an eye link or metal modular conveyor belt or other types of conveyor belts such as a flat wire conveyor belt. The splice link 110 can be positioned at a nominal ten foot increment of belt length (or any other length increment suitable for the particular product or application). This installation of splice link 110 is intended to provide locations throughout the length of the belt 100 whereby an operator can easily separate the belt, make repairs or remove sections, and then reconnect the belt without the need for replacement components or special tools. Hence, the splice link facilitates the use of a modular conveyor belt.

Referring also to FIGS. 3-6, based on a typical double-row bar assembly for a metal conveyor belt edge, splice link 110 defines a means for locking and retention between adjacent edge bar links 106. According to the disclosure herein, the splice link 110 comprises two bars 112, 114 that are specially shaped to lock into one another while also capturing the rods 102. More particularly, an outer locking bar 112 has lower tabs 116 to lock into corresponding openings 118 on a flange 130 of an inner connector bar 114. The outer locking bar 112 also includes an offset portion 120 that engages a corresponding upper tab 122 on the inner connector bar 114. Still further, the outer locking bar 112 includes an inward facing raised area or bump 124 that engages a corresponding hole 126 on the inner connector bar 114. The bump 124 and hole 126 are shown as being round in the exemplary embodiment, but other shapes and configurations are of course possible. The outer locking bar 112 becomes locked into position once the small raised bump 124 on the locking bar 112 engages with the hole 126 on the inner connecting bar 114.

The inner connector bar 114 further includes side projecting offsets 132 or "ears" that effectively provide the correct spacing between the two rows of bars links 106 of the connector and permits the proper engagement with the adjacent bar links 106 within the overall belt assembly. The side projecting offsets 132 preferably each include an opening 134 through which the rods 102 extend.

The outer locking bar 112 includes slot openings 134 designed to capture the rods 102 at the splice link that connect the belt 100 together by engaging an annular groove 108 in each of the rod ends 104, effectively preventing the rods 102 from moving laterally within the belt 100. Of note, the rods 102 disposed on each side of the splice link 110 include grooves 108 in order to accommodate the splice link. The remaining rods 102, preferably, do not include the grooves. In addition, once fully seated, the outer locking bar 112 has a small slit 128 defined between the outer locking bar 112 and the flange 130 of the inner connecting bar 114 that would allow for the insertion of a screwdriver or similar object to force the outer locking bar 112 upward and out of its locked position. To seat this component, one needs only to properly align the inner and outer bars 112, 114, and tap the outer bar 112 into position.

Figure 7:
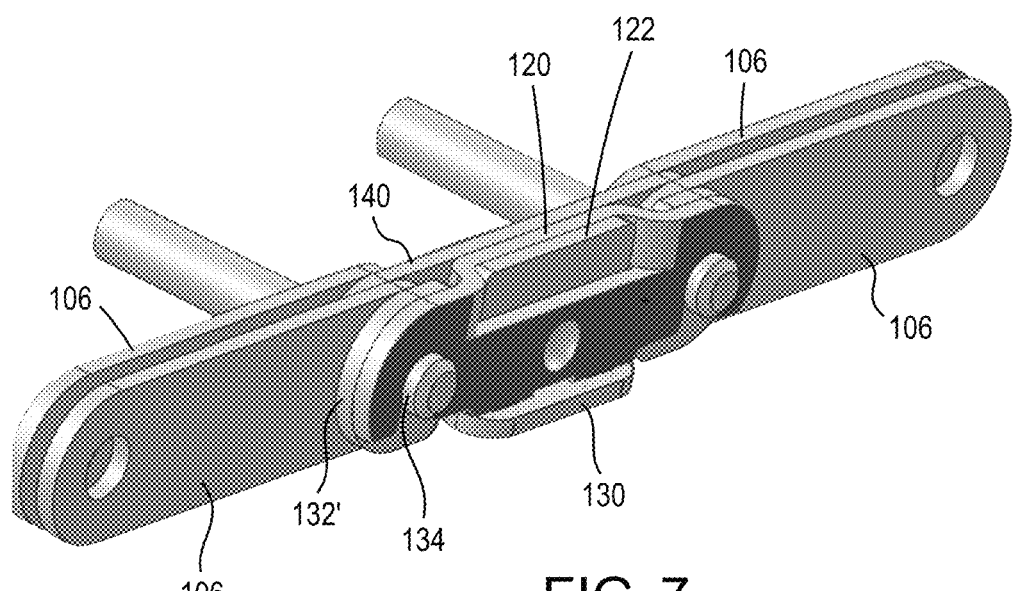
FIG. 7 is a perspective view of the splice link according to a second exemplary embodiment of the disclosure.
Figure 8:
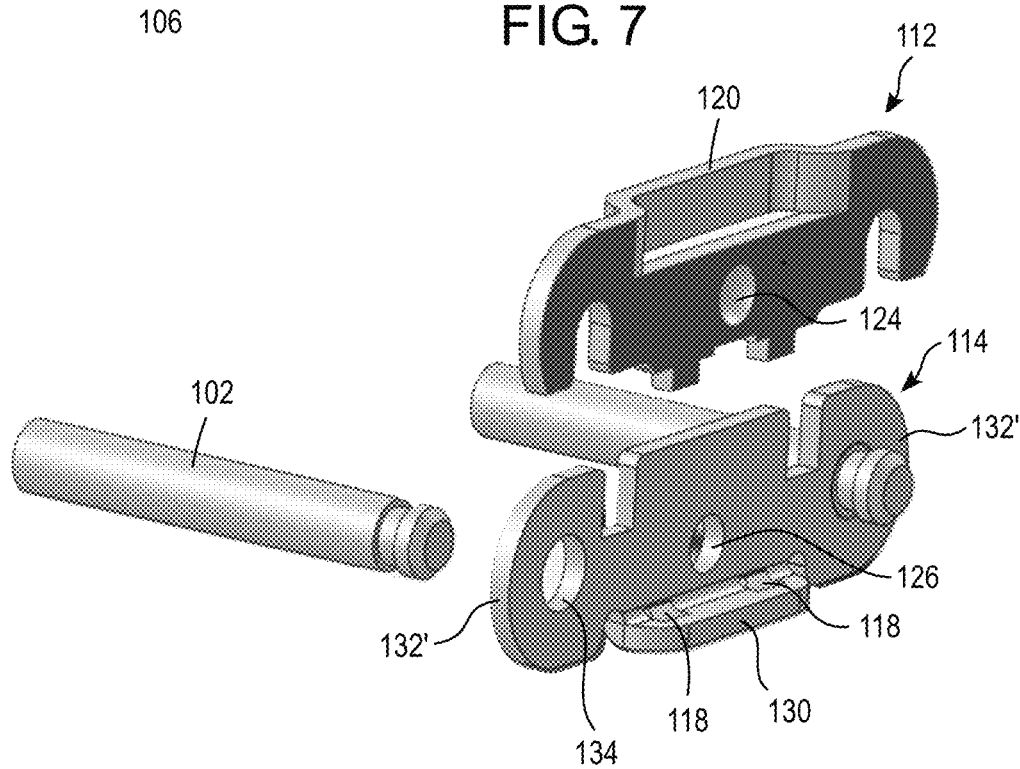
FIG. 8 is an exploded perspective view of the splice link according to the second exemplary embodiment of the disclosure.
Figure 9:
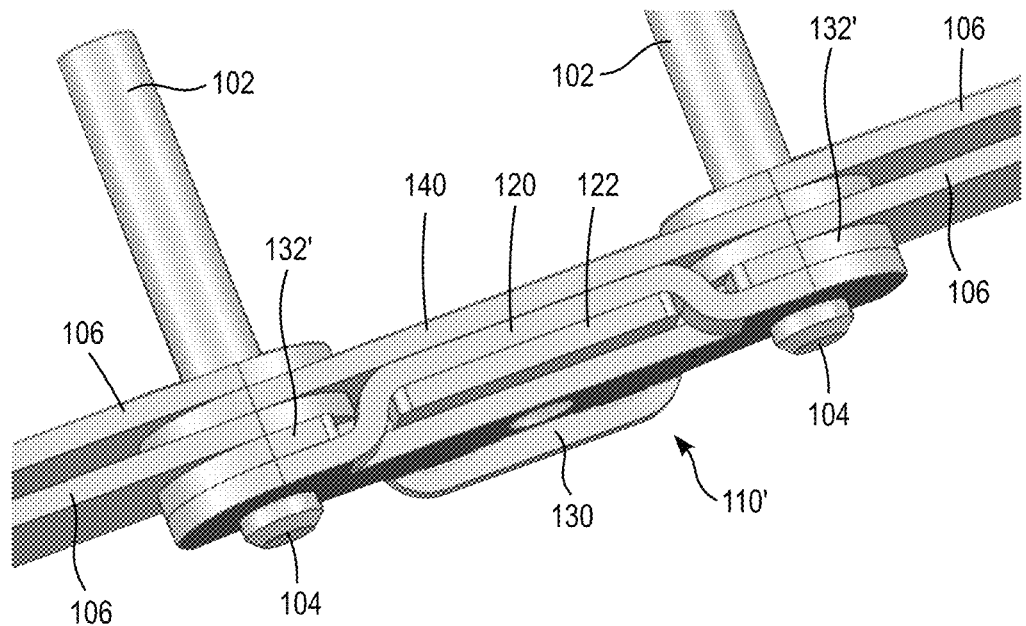
FIG. 9 is a top perspective view of the splice link according to the second exemplary embodiment of the disclosure.

Referring next to FIGS. 7-9, in a second embodiment of the splice link 110', the inner connecting bar 114 and the outer locking bar 112 are placed together on the outer edge of the belt 100 to form a belt connection similar to the embodiment described above and shown in FIGS. 2-6. However, in this alternate assembly, a further connecting bar 140 is used to complete the splice. Connecting bar 140 is preferably a standard edge bar link 106 being used for the particular belt. More particularly, connecting bar 140 is disposed between bar links 106 to maintain the spacing rather than the side projecting offsets 132 of the inner connecting bar 114. In view of the addition of connecting bar 140, the side projecting "ears" 132' are not offset in the second embodiment shown in FIGS. 7-9. Hence, both the inner connecting bar 114 and the outer locking bar 112 are disposed outwardly from the outermost bar links 106. The splice link 110 means for locking and retention remain the same as in the first described embodiment.

Figure 10:
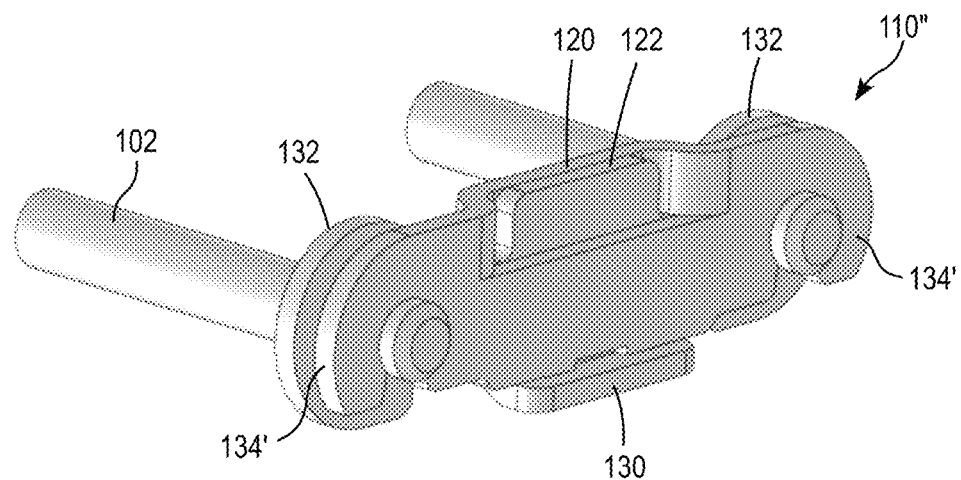
FIG. 10 is a perspective view of the splice link according to a third exemplary embodiment of the disclosure.
Figure 11:
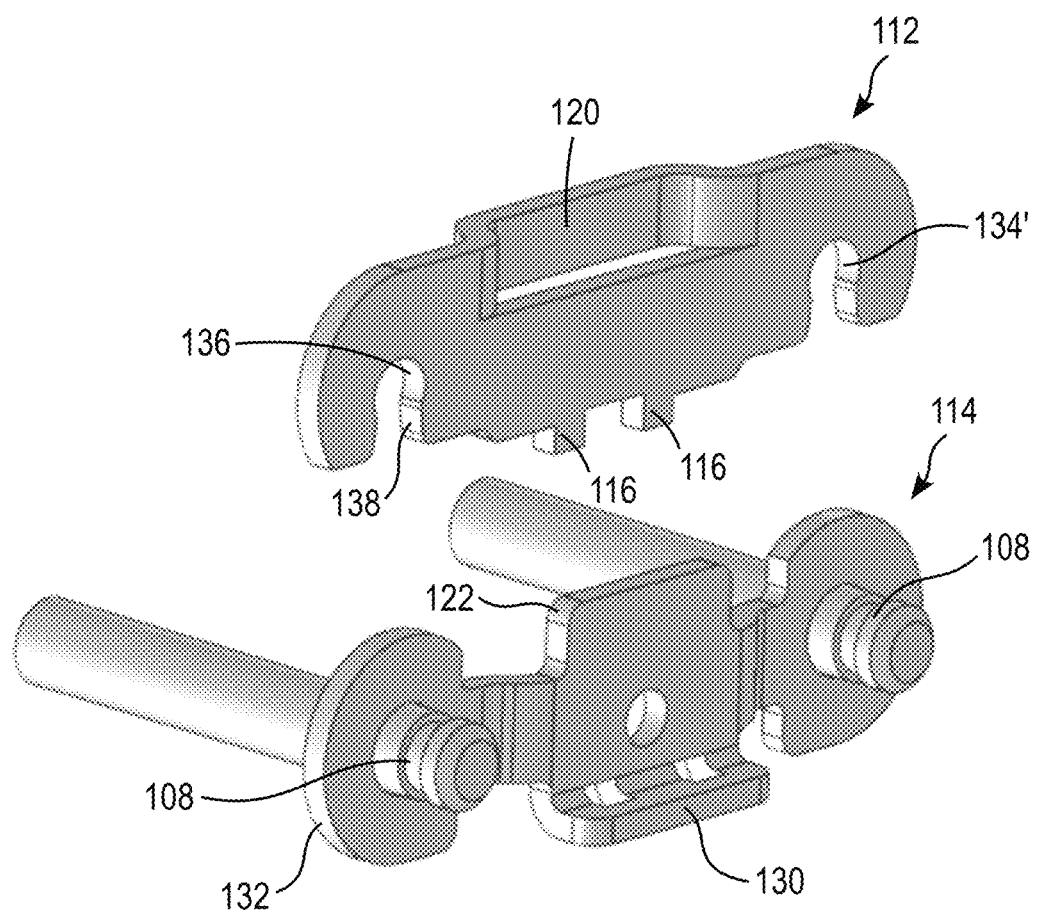
FIG. 11 is an exploded perspective view of the splice link according to the third exemplary embodiment of the disclosure.
Figure 12:
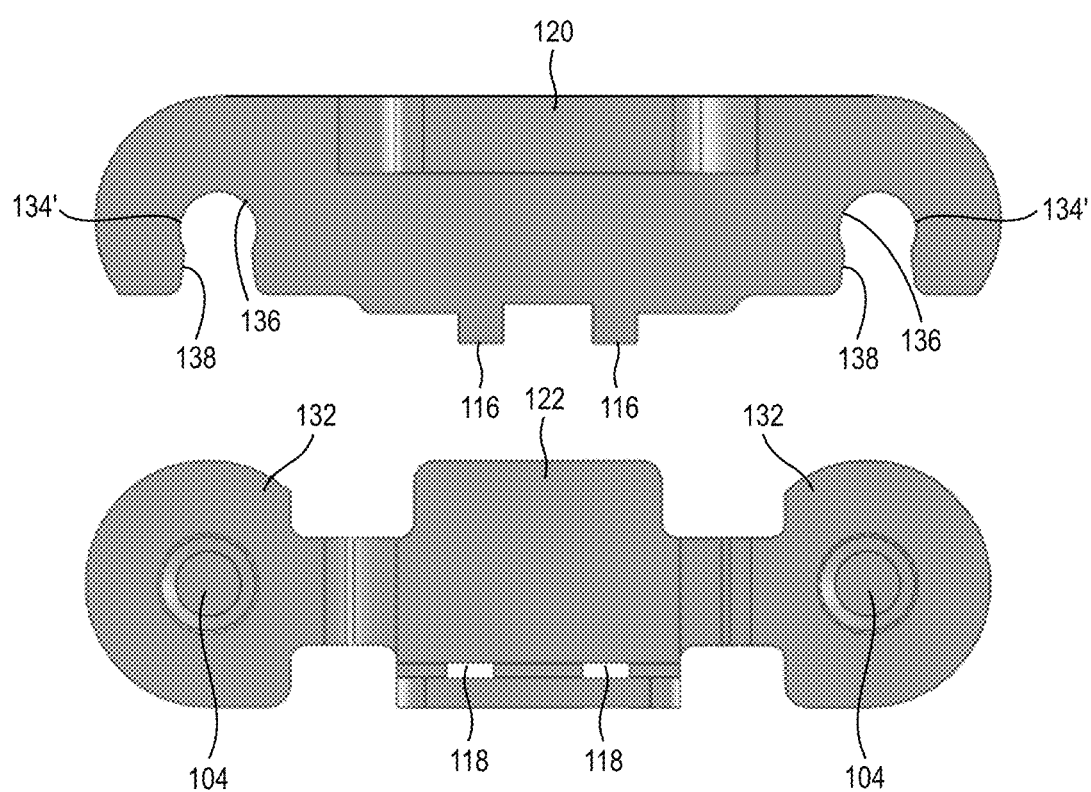
FIG. 12 is an exploded elevational view of the splice link according to the third exemplary embodiment of the disclosure.
Figure 13:
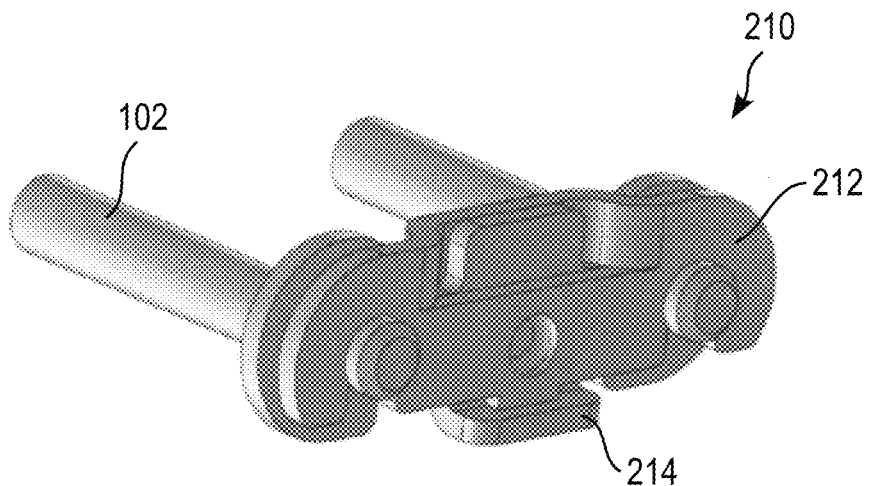
FIG. 13 is a perspective view of a portion of a conveyor belt including a splice link according to a further modification of the first exemplary embodiment of the disclosure.
Figure 14:
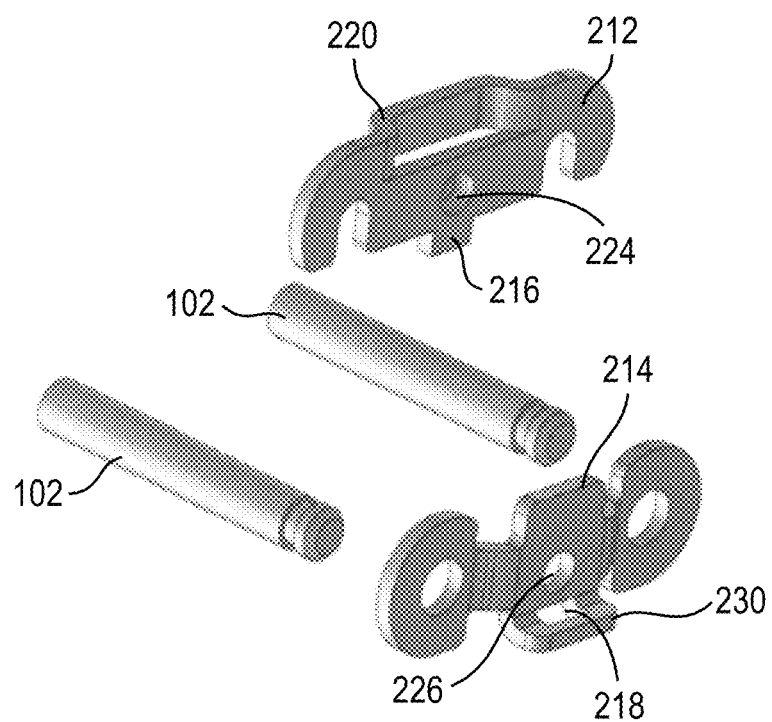
FIG. 14 is an exploded perspective view of the splice link according to the further modification of the first exemplary embodiment shown in FIG. 13.
Figure 15:
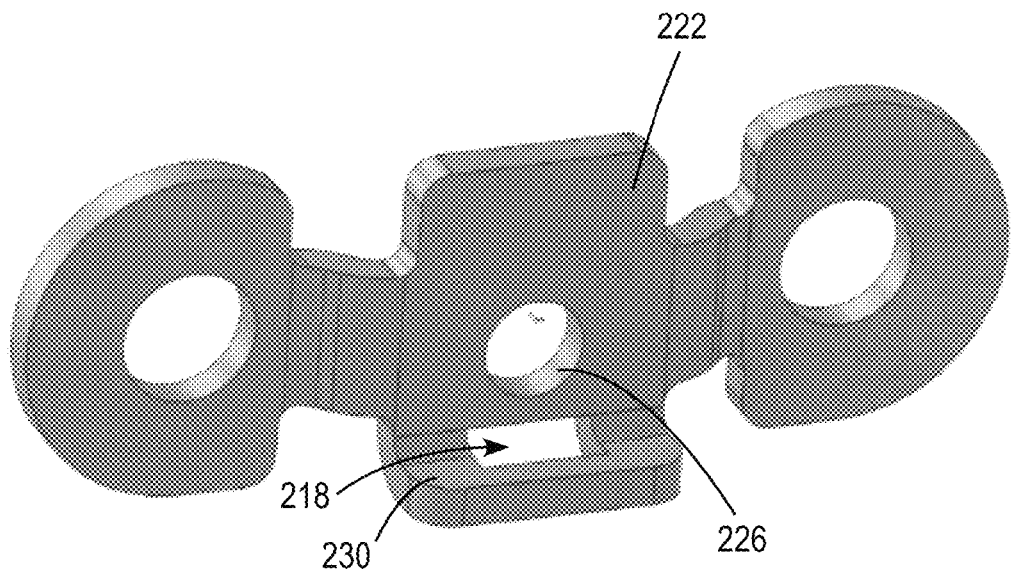
FIG. 15 is a perspective view of the inner connecting bar of the splice link according to the further modification of the first exemplary embodiment shown in FIG. 13.
Figure 16:
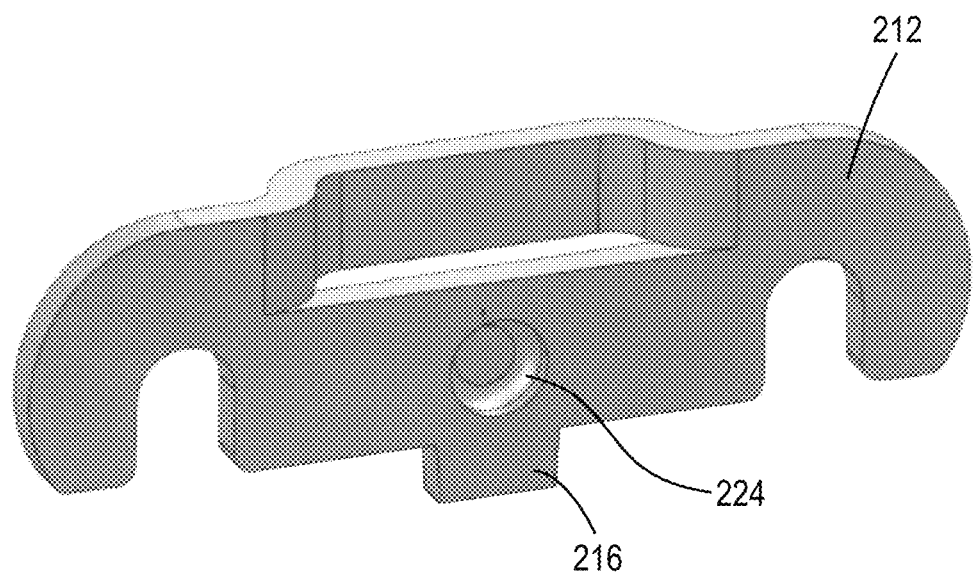
FIG. 16 is a perspective view of the outer locking bar of the splice link according to the further modification of the first exemplary embodiment shown in FIG. 13.

A third embodiment of the splice link 110" according to the disclosure herein is shown in FIGS. 10-12. In this embodiment, the outer locking bar 112 includes slot openings 134' that includes a type of snap fit over the annular grooves 108 in the rods 102 to maintain the locking bar 112 into position rather than the small bump 124 shown in the first and second embodiments. More particularly, slot openings 134' include a rounded upper portion 136 corresponding to the shape of the groove 108 in rod 102 and a tapered neck portion 138 which serves to fix the outer locking bar onto the rod 102. As noted above, the rods 102 disposed on each side of the splice link 110" include grooves 108 in order to accommodate the splice link. The remaining rods 102, preferably, do not include the grooves.

With reference to FIGS. 13-16, a further modification of the first embodiment includes a splice link 210 comprising two bars 212, 214 that are specially shaped to lock into one another while also capturing the rods 102. More particularly, an outer locking bar 212 has a single lower tab 216 to lock into a corresponding opening 218 on a flange 230 of inner connector bar 214. The outer locking bar 212 also includes an offset portion 220 that engages a corresponding upper tab 222 on the inner connector bar 214. Still further, the outer locking bar 212 includes an inward facing raised area or bump 224 that engages a corresponding hole 226 on the inner connector bar 214. The bump 224 and hole 226 are shown as being round in the exemplary embodiment, but other shapes and configurations are of course possible. The outer locking bar 212 becomes locked into position once the small raised bump 224 on the locking bar 212 engages with the hole 226 on the inner connecting bar 214. Splice link 210, having only a single lower tab rather than a plurality of lower tabs as described in the first embodiment, is best suited for use with a shorter pitch belt. The remaining features of splice link 210 are the same as the first embodiment of the splice link 10 and are not repeated here.

Figure 17:
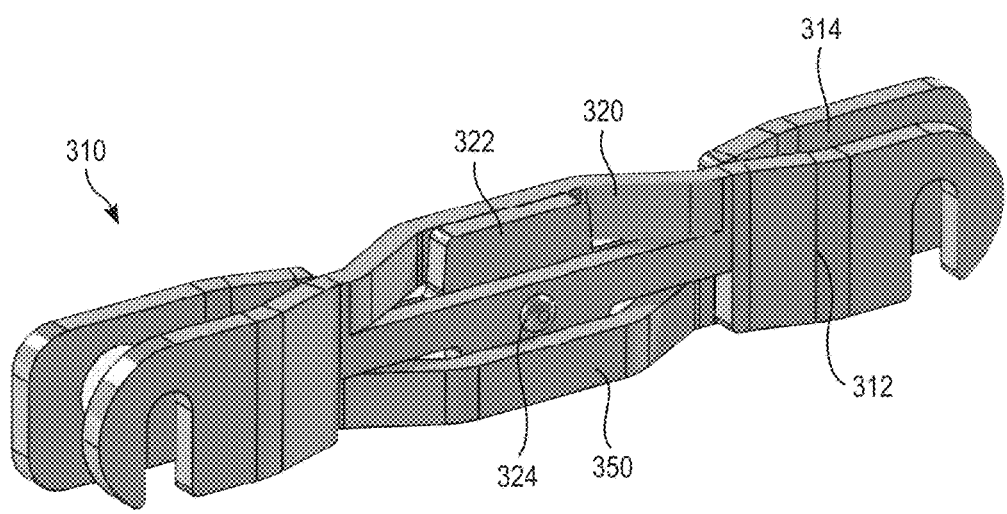
FIG. 17 is a front perspective view of a splice link according to a further modification of the first exemplary embodiment of the disclosure.
Figure 18:
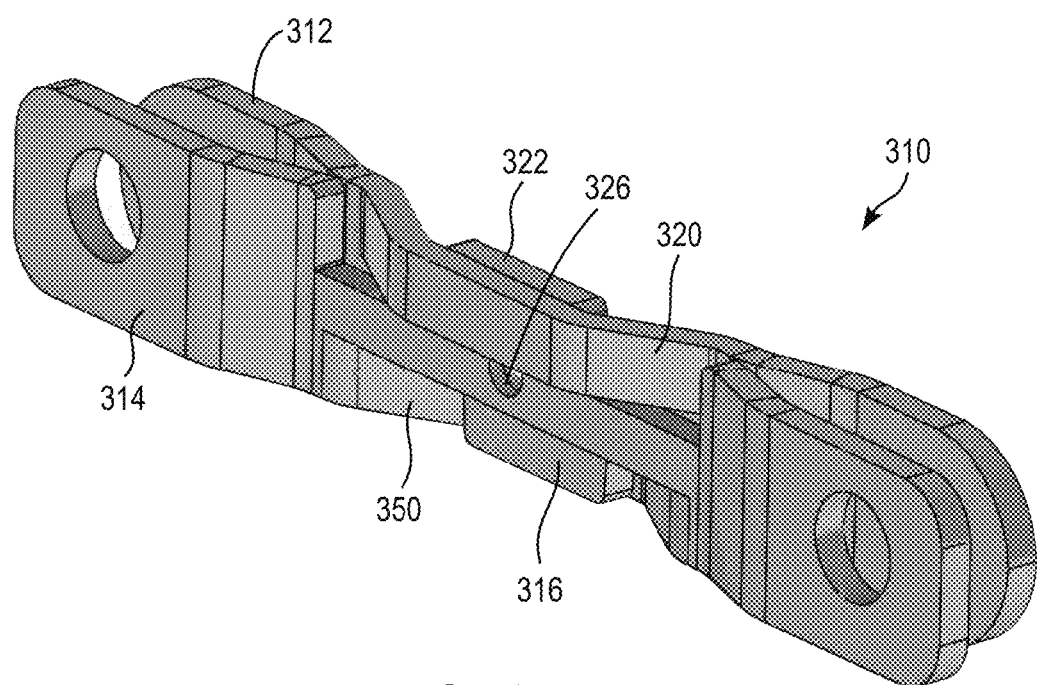
FIG. 18 is a rear perspective view the splice link according to the further modification shown in FIG. 17.

With reference to FIGS. 17-18, a still further modification of the first embodiment includes a splice link 310 comprising two bars 312, 314 that are specially shaped to lock into one another while also capturing the rods 102, as explained above. More particularly, an outer locking bar 312 has a single lower tab 316 to lock into a corresponding offset bar or portion 350 of inner connector bar 314. The outer locking bar 312 also includes an offset bar or portion 320 that engages a corresponding upper tab 322 on the inner connector bar 214. Still further, the outer locking bar 312 includes an inward facing raised area or bump 324 that engages a corresponding hole 326 on the inner connector bar 314. The bump 324 and hole 326 are shown as being round in the exemplary embodiment, but other shapes and configurations are of course possible. The outer locking bar 312 becomes locked into position once the small raised bump 324 on the outer locking bar 312 engages with the hole 326 on the inner connecting bar 314. Splice link 310, illustrating only a single lower tab, could also include a plurality of lower tabs as described in the first embodiment. The remaining features of splice link 310 are the same as the first embodiment of the splice link 10 and are not repeated here.

While the disclosure herein has been described with respect to exemplary embodiments of the invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

The invention claimed is:

1. A splice link for a conveyor belt comprising:
   an outer locking bar including at least one lower tab and an offset portion;
   an inner connector bar including at least one opening configured to receive the at least one lower tab on the outer locking bar and a front face having an upper tab, the offset portion on the outer locking bar configured to engage the upper tab of the inner connector bar.

2. The splice link according to claim 1, wherein the outer locking bar further includes a plurality of slot openings configured to engage a rod of the conveyor belt.

3. The splice link according to claim 2, wherein the inner connector bar includes a hole and the outer locking bar includes a raised bump facing inwardly towards the inner connector bar, the raised bump configured to engage the hole to thereby lock the outer locking bar into position with the inner connector bar.

4. The splice link according to claim 2, wherein the inner connector bar includes opposing side projecting ears, each ear including an opening through which the rod of the conveyor belt can be inserted.

5. The splice link according to claim 2, wherein said opposing side projecting ears are offset from the front face of the inner connector bar.

6. The splice link according to claim 2, wherein the plurality of slot openings include a rounded upper portion and a tapered neck portion.

7. The splice link according to claim 1, further comprising a bar link disposed inwardly from the inner connector bar.

8. A conveyor belt comprising:
   a plurality of spaced tractive rods transversely disposed with respect to a direction of travel of the conveyor belt, each said rod having opposing first and second ends and a groove in each said end;
   a plurality of parallel pairs of edge bar links interconnecting said plurality of spaced tractive rods; and
   a splice link disposed between adjacent pairs of edge bar links;
   wherein the splice link comprises:
   an outer locking bar including at least one lower tab and an offset portion; and
   an inner connector bar including at least one opening configured to receive the at least one lower tab on the outer locking bar and a front face having an upper tab, the offset portion on the outer locking bar configured to engage the upper tab of the inner connector bar.

9. The conveyor belt according to claim 8, further comprising:
   a plurality of rows of flat wire wickets transversely disposed with respect to a direction of travel and interconnecting said plurality of spaced tractive rods.

10. The conveyor belt according to claim 8, wherein the inner connector bar includes a hole and the outer locking bar includes a raised bump facing inwardly towards the inner connector bar, the raised bump configured to engage the hole to thereby lock the outer locking bar into position with the inner connector bar.

11. The conveyor belt according to claim 8, wherein the inner connector bar includes opposing side projecting ears, each ear including an opening through which one of the plurality of rods of the conveyor belt can be inserted.

12. The conveyor belt according to claim 11, wherein said opposing side projecting ears are offset from the front face of the inner connector bar, said side projecting ears being disposed between the parallel pairs of edge bar links.

13. The conveyor belt according to claim 8, wherein the outer locking bar further includes a plurality of slot openings include a rounded upper portion corresponding to a shape of the groove in the rod and a tapered neck portion which serves to fix the outer locking bar onto the rod.

14. The conveyor belt according to claim 8, wherein the conveyor belt comprises a metal modular conveyor belt.

15. A splice link for a conveyor belt comprising:
an outer locking bar including at least one downwardly projecting lower tab and an outer offset portion;
an inner connector bar including an inner offset portion configured to receive the at least one lower tab on the outer locking bar and a front face having an upwardly projecting upper tab, the outer offset portion on the outer locking bar configured to engage the upper tab of the inner connector bar.

16. The splice link according to claim 15, wherein the inner connector bar includes a hole and the outer locking bar includes a raised bump facing inwardly towards the inner connector bar, the raised bump configured to engage the hole to thereby lock the outer locking bar into position with the inner connector bar.

17. The splice link according to claim 16, wherein the inner connector bar includes opposing side projecting ears, said opposing side projecting ears being offset from the front face of the inner connector bar.

* * * * *